(No Model.) 2 Sheets—Sheet 1.

A. HARPOLD.
FRUIT PITTING MACHINE.

No. 553,649. Patented Jan. 28, 1896.

Witnesses:
Perry Kingman.
F. M. Townsend.

Inventor
Adam Harpold
by Hazard & Townsend
his Attys

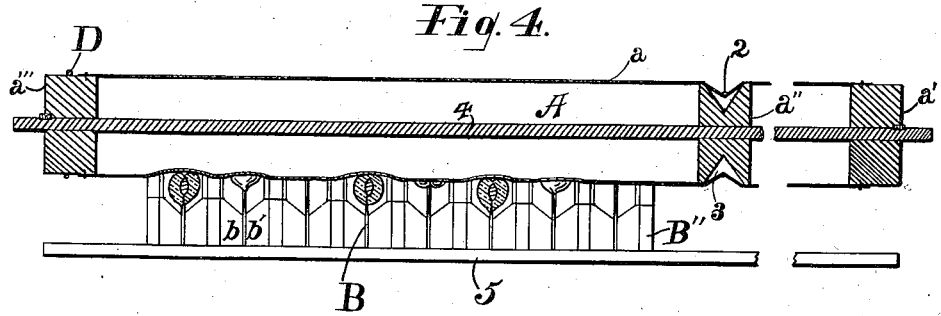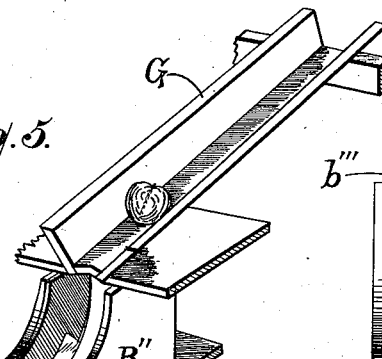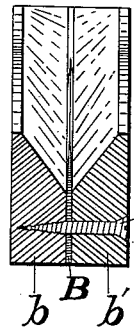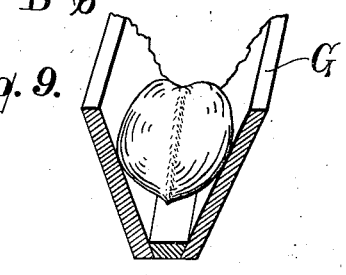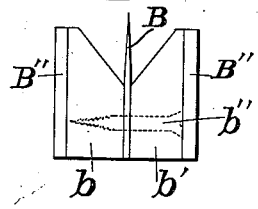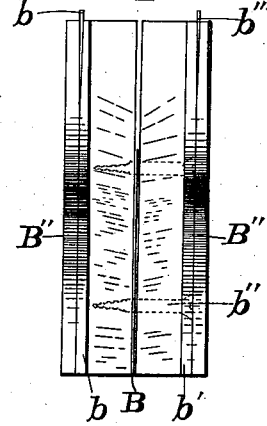

UNITED STATES PATENT OFFICE.

ADAM HARPOLD, OF COLTON, CALIFORNIA, ASSIGNOR OF THREE-FOURTHS TO WALTER A. CHOATE, OF SAME PLACE, AND FRANCIS A. JONES, OF LOS ANGELES, CALIFORNIA.

FRUIT-PITTING MACHINE.

SPECIFICATION forming part of Letters Patent No. 553,649, dated January 28, 1896.

Application filed June 27, 1895. Serial No. 554,208. (No model.)

*To all whom it may concern:*

Be it known that I, ADAM HARPOLD, a citizen of the United States, residing at Colton, in the county of San Bernardino and State of California, have invented a new and useful Fruit-Pitting Machine, of which the following is a specification.

The object of my invention is to provide an improved fruit-pitting machine which will rapidly remove the pits from freestone fruits without bruising the fruit.

It is the purpose of my invention to provide light-running means for operating upon a large number of fruits at the same time, and to so feed a large number of fruits to the machine as to operate upon them successively with great rapidity and without any clogging or interference.

My invention comprises a feeding device and a pitting device proper; and it consists in the complete machine and the parts and combinations hereinafter set forth.

The accompanying drawings illustrate my invention.

Figure 1:
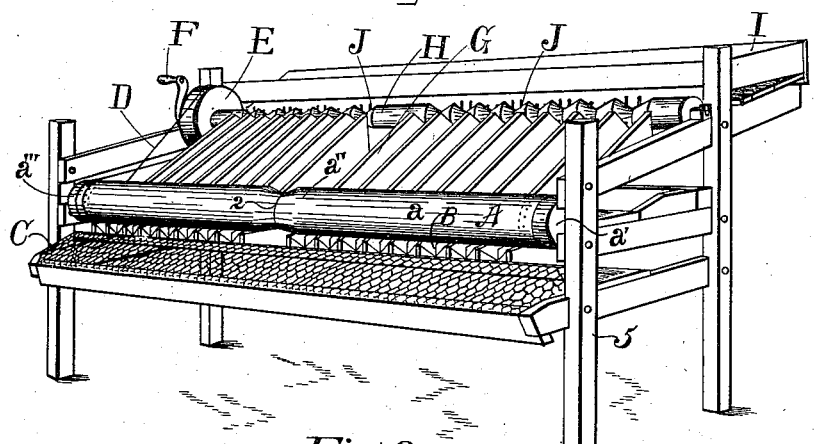
Figure 2:
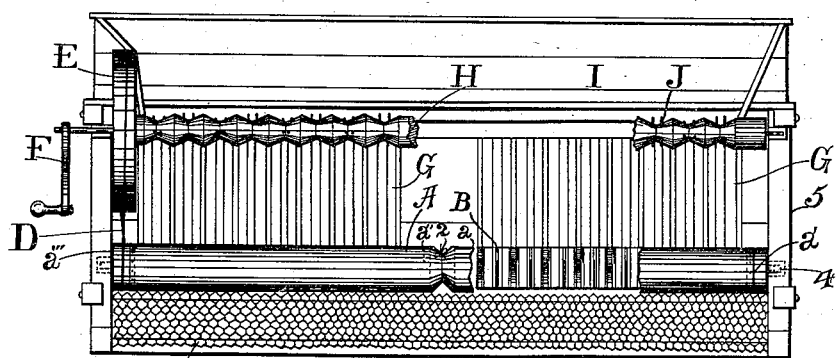
Figure 3:
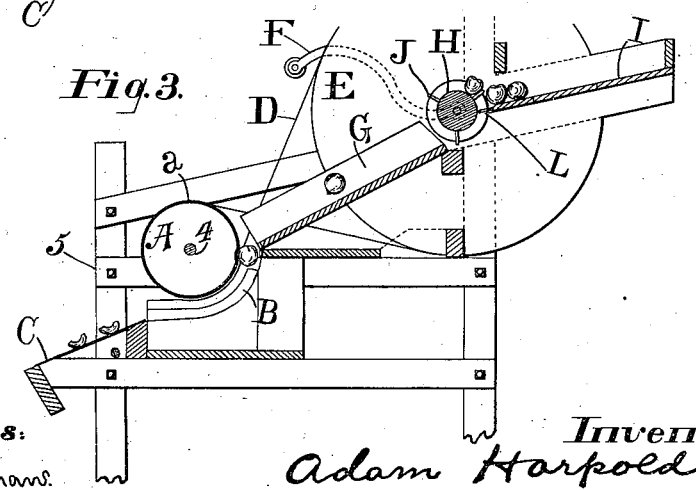

Figure 1 is a perspective view of the machine in position to be operated. Fig. 2 is a fragmental plan view, a portion of the pitting and feed rollers being removed. Fig. 3 is a vertical section of the machine across the rollers and along the fruit-chute. Fruits are shown in various positions passing through the machine. Fig. 4 is a fragmental axial section of the pitting-roller, and also shows the knives and fruit in position while being cut. Fig. 5 is a fragmental detail of one of the chutes and pitting-knives. Fig. 6 is a vertical cross-section through the knife, including its side blocks, and shows such blocks secured by a screw to the blade of the knife. Fig. 7 is an elevation of the end of the same. Fig. 8 is a plan showing the knife secured in its seat by wedges. Fig. 9 is a perspective cross-sectional view of one of the fruit-chutes with a fruit therein.

In the drawings I have shown a machine provided with a series of knives, so that a large number of fruits will be operated upon simultaneously; but it is to be understood that the invention can be applied with a greater or less number of knives.

A indicates the roller for applying the fruit to the knives B of the fruit-pitter. This roller consists of a peripheral sleeve $a$, of canvas or like material, carried by and extending between circular heads $a'$ $a''$ $a'''$. This forms a yielding belt which is carried between the heads. The fruit-splitting knives B are fastened to the frame 5 of the machine, and are arranged near the periphery of the roller intermediate the heads, so that the fruit when fed to the edge of the knife and brought against the peripheral sleeve will be carried under by the sleeve when the roller is rotated, and will be rolled along the edge of the knife, thus splitting the pulp from the fruit, so that the free stone can fall out.

The advantage of using a roller having its fruit-contacting periphery made of canvas is that the canvas yields so as to fit to the fruit in such a manner as to roll it properly on the knife without bruising the fruit. The sleeve is unsupported except at the heads, and therefore has superior springiness and yielding qualities. Though the canvas sleeve is adapted to yield, it is also adapted to be made sufficiently firm to carry fruit along the edge of the knife to accomplish the splitting thereof, so that the free stone will drop out or will be ready to be easily removed. For this purpose I provide a suitable tension device, which I will hereinafter describe.

C indicates a wire-netting trough arranged at the end of the machine to hold the halves of the fruit-pulp and to allow the stones to fall through the meshes and be separated from the pulp. I provide suitable means for rotating the pitting-roller. The means, as shown, consists of a belt D running on the head $a'''$ and carried over the pulley E, which is operated by the crank F.

The peripheral flexible sleeve $a$ snugly fits the cylindrical heads $a'$, &c., of the roller, and is drawn taut, so that ordinarily the sleeve is cylindrical; but when the sleeve contacts with the fruit the sleeve will yield and be pressed in and will fit itself to and seat the fruit and will maintain a gentle pressure upon the fruit and will roll it along the knife until the pulp has been severed. The space between the sleeve and the fruit-pitting knife is somewhat greater than the diameter of the stone of the fruit, and the sleeve has sufficiently-yielding qualities to allow the fruit to be pressed upon the knife by the roller without bruising the fruit.

In order to conveniently give a suitable tension to the sleeve, I provide the roller with suitable sleeve-stretching means. These means, as illustrated by the accompanying drawings, consist of the band 2 arranged around the sleeve over a band-receiving groove 3 in the roller, into which the sleeve can be drawn by the tightening-band. When the band is tightened and the sleeve is thereby drawn into the groove, this draws the sleeve endwise and draws it taut between the heads. As shown in the drawings, the tightening-band groove is arranged in the head $a''$ between the end heads, $a'$ and $a'''$. The sleeve is fastened at its ends to the end heads, $a'$ $a'''$, and when the inner band is tightened it draws the sleeve taut on each side of the middle head, $a''$, and between such head and the end heads.

4 indicates the axle of the roller, and this is journaled in the frame 5 of the machine.

It is desirable that suitable means for feeding the fruits to the knife in rapid succession be provided. These means, as shown, consist of chutes G, one for each knife. The several chutes are inclined sufficiently to allow the fruit to roll theredown toward the knife. Each knife is arranged in front of and below its chute at the lower end thereof. The chutes are trough-shaped, having oblique sides, so that as the fruit rolls down the chute it will turn with its width vertical. This causes fruits such as apricots and peaches, which are slightly flattened, to roll down the chute with the seam of the fruit at the equator of the revolving fruit, so that the knife will contact with the fruit at the seam of the fruit, and then when the roller carries the fruit along the knife to split the pulp the cut is made along the seam of the fruit and over the seam of the stone, so that the stone will readily separate from the cut fruit. In practice I find that a very large percentage of the fruits which pass through the machine are cut at the seam. The edge of each knife is curved substantially concentric with the pitting-roller and is of such length that when the largest size fruit that is to be cut by the machine is passed through the machine the knife will serve to fully split the pulp entirely around the same.

H indicates an annularly-grooved feed-roller arranged between the feed-hopper I and the feed-chutes G, and provided with one or more pairs of fruit-feeding pins J arranged in its grooves to pick the fruit from the hopper and deliver it to the chute. These pairs of pins are arranged around the periphery of the feed-roller and within the grooves and project radially and are set at such distances apart as to feed the fruit with sufficient rapidity, and yet to avoid any clogging by too-rapid feeding.

In the machine I have made the feed-roller is about four inches in diameter and the grooves of sufficient depth to form with the pair of pins suitable pockets for catching the fruits one by one and carrying them over the roller and delivering them to the chutes. In each of the annular grooves of this roller I have provided three pairs of feed-pins and have geared the pitting-roller with the feed-roller by suitable means—such as the pulley E, head $a'''$ and band D—so that one rotation of the feed-roller will produce three rotations of the pitting-roller. Then at each revolution of the crank the feed-roller will at each of its grooves successively remove three fruits from the hopper and will deposit the fruits in the chute leading to the knife below the pitting-roller. One after the other the fruits roll down the chute until they contact with the knife and the sleeve, and then the rotating sleeve rolls the fruit along the knife so that the knife divides the pulp along the seam, so that the pulp becomes detached from the stone and it and the stone are discharged into the wire-netting which sustains the pulp but allows the stone to fall through its meshes.

L indicates a stop-pin inserted in the hopper to project toward the feed-roller between the paths of the feeding-pins, so that a fruit which might roll down the chute between the pairs of feeding-pins will be intercepted and held until the feeding-pins catch the same. Then such pins will carry the fruit over the roller and feed it into the chute. The feed-roller virtually forms the lower side of the feed-hopper and prevents the fruit from rolling too rapidly into the chutes.

The feed-pins may be set alternately in position in the several annular grooves, so that the fruits will be fed to the several chutes alternately and not reach the roller at the same time from all the chutes.

Peaches and apricots are usually narrowest at the diameter which crosses the plane of the seam. I propose to turn this to use. To do this the inclined feed-chute is made with slightly converging sides arranged so that the chute is narrower at its bottom than the shortest diameter of the fruit to be operated upon, and is virtually wider at its top than the greatest diameter of such fruit, so that when the fruit is dropped thereinto by the feed-roller it will be caught by the trough and will roll down the same and will be turned thereby to bring the shortest diameter transverse the chute. The fruit will then roll down the chute, rotating on its shortest axis, and will then contact only at the ends of such axis with the sides of the chute. The fruit will thus be rolled down the chute and delivered to the knife in position to be cut along the seam.

In the drawings I have shown a chute the sides of which are each made of a single piece; but it would be within my invention to form them of wires or other contrivances, such as cords or skeleton frames, care being had to so arrange the sides of the chutes, however constructed, that the fruit will, when rolling down it with its shortest diameter transverse the chute, contact only at or close to the ends of its shortest axis. This is accomplished in the form shown by making the side walls of the chute converge less than the sides of the fruit converge.

The blade B is reinforced on its opposite sides by blocks $b$ $b'$ which are beveled at their upper inside edges and are secured to the knife by screws $b''$ which are inserted through one of the blocks and the blade B and are screwed into the other block.

$B''$ $B''$ are side blocks or stops arranged to form a socket into which the knife, including the side blocks thereof, can be inserted from behind and wedged in place by wedges $b'''$.

The blade B of the knife projects above the side blocks $b$ $b'$ thereof, so that when the fruit falls over the chute G it will strike upon the blade B and will be carried therealong by the rotating sleeve of the roller, and the trough formed by the side blocks $b$ $b'$ will not engage with the fruit until the knife has cut into the pit of the fruit, and will serve to steady and guide the severed halves of the fruit and to conduct the same out of the machine as they are acted upon by the rotating sleeve. The side blocks $b$ $b'$ and the knife are curved to conform to the under face of the roller.

In order to adjust the knife into the desired position for cutting, it is inserted into the socket formed by the socket-pieces $B''$ $B''$ and secured in place by the wedges. If it is desired to adjust the knife to a different position, the wedges can be loosened and the block with its blade be readjusted. The blades are thus adapted to be removed for sharpening and to be replaced with but very little difficulty.

Now, having described my invention, what I claim as new, and desire to secure by Letters Patent, is—

1. In a fruit pitting machine, the combination of a rotating roller comprising two heads and a yielding belt carried between the two heads; and a fruit splitting knife arranged near the periphery of the roller and intermediate the two heads.

2. The combination of a rotating roller comprising a fruit engaging periphery of canvas carried between two heads; a fruit pitting knife arranged near the periphery of the roller intermediate the heads; a fruit chute leading to the knife; a fruit hopper; an annularly grooved roller arranged between the hopper and the chute and provided with one or more pairs of pins arranged to pick the fruit from the hopper and deliver it to the chute, and means for rotating the two rollers.

3. A fruit pitting machine having an inclined fruit pitting chute; a fruit pitting knife and roller arranged at the lower end of such chute; a feed hopper at the other end of such chute; and a feed roller of smaller diameter than the other roller, arranged between the hopper and the chute and provided with pairs of projecting fruit feeding pins; means for rotating the feed roller; and suitable means gearing the feed roller with the pitting roller and arranged to drive the pitting roller at greater speed than the feed roller.

4. The combination of the pitting knife; the roller for rolling the fruit along the edge of the knife; the feed roller adapted and arranged to feed the fruits singly; and the inclined fruit chute set forth leading from the feed roller to the knife and having slightly converging sides arranged so that the chute is narrower at its bottom than the shortest diameter of the fruit to be operated upon, and wider at the top than the greatest diameter of such fruit.

5. The combination of the blade; the side blocks secured thereto by the screws; the socket pieces arranged to form a socket to receive the same; and the wedges arranged to wedge the knife and its blocks in the socket.

ADAM HARPOLD.

Witnesses:
J. E. MATOT,
JOSEPH ANDREWS.